United States Patent
Harada et al.

(10) Patent No.: US 6,790,562 B2
(45) Date of Patent: Sep. 14, 2004

(54) SEPARATOR FOR ALKALINE SECONDARY BATTERY, METHOD FOR PREPARING THE SAME ALKALINE SECONDARY BATTERY

(75) Inventors: Yasuyuki Harada, Naruto (JP); Tadayoshi Tanaka, Takatsuki (JP); Katsuhiko Shinyama, Higashioosaka (JP); Toshiyuki Nohma, Hirakata (JP); Ikuo Yonezu, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 260 days.

(21) Appl. No.: 10/097,837

(22) Filed: Mar. 15, 2002

(65) Prior Publication Data

US 2002/0177046 A1 Nov. 28, 2002

(30) Foreign Application Priority Data

Mar. 16, 2001 (JP) ........................................ 2001/075957

(51) Int. Cl.$^7$ ................................................ H01M 2/16

(52) U.S. Cl. ........................ 429/250; 429/254; 442/115

(58) Field of Search ................................ 429/248, 249, 429/250, 253, 254; 442/115, 247

(56) References Cited

U.S. PATENT DOCUMENTS

| 6,384,100 | B1 | * | 5/2002 | Choi ....................... 429/249 X |
| 6,403,265 | B1 | * | 6/2002 | Tanaka et al. .............. 429/249 |
| 6,436,581 | B1 | * | 8/2002 | Senyarich et al. .......... 429/248 |
| 6,537,695 | B2 | * | 3/2003 | McLoughlin et al. ... 429/248 X |
| 6,623,809 | B2 | * | 9/2003 | Tsukiashi et al. ....... 429/249 X |
| 2002/0160259 | A1 | * | 10/2002 | Kinn et al. ............. 429/250 X |

FOREIGN PATENT DOCUMENTS

| JP | 63-034849 | 2/1988 |
| JP | 05-190165 | 7/1993 |
| JP | 08-185847 | 7/1996 |

* cited by examiner

Primary Examiner—Stephen J. Kalafut
(74) Attorney, Agent, or Firm—Westerman, Hattori, Daniels & Adrian, LLP

(57) ABSTRACT

In an alkaline secondary battery provided with a positive electrode, a negative electrode, a separator to be interposed between the positive electrode and the negative electrode, and an alkaline electrolyte solution, the above-mentioned separator has carbon-carbon double bonds. Further, an average amount of carbon-carbon double bonds in the separator is in the range of 10 $\mu$mol/g to 200 $\mu$mol/g, and an average amount of increased nitrogen in the separator after the separator is immersed in an alkaline aqueous solution having ammonium salt dissolved therein is not less than 140 $\mu$g/g.

4 Claims, 1 Drawing Sheet

SEPARATOR FOR ALKALINE SECONDARY BATTERY, METHOD FOR PREPARING THE SAME ALKALINE SECONDARY BATTERY

BACKGROUND OF THE INVENTION

1. Field of the Invention

The present invention relates to an alkaline secondary battery such as a nickel-metal hydride battery, a separator for an alkaline secondary battery to be interposed between a positive electrode and a negative electrode in the alkaline secondary battery and a method for preparing the above-mentioned separator for an alkaline secondary battery, and is characterized in that storage characteristic of the alkaline secondary battery is improved by improving the separator for an alkaline secondary battery so as to prevent self-discharge in the alkaline secondary battery.

2. Description of the Related Art

A nickel-metal hydride battery, a nickel-cadmium battery and the like have been heretofore used as an alkaline secondary battery. In the alkaline secondary battery as described above, polyolefin materials excellent in resistance to alkalinity and residence to oxidization have been used for a separator to be interposed between a positive electrode and a negative electrode.

However, the polyolefin materials are not hydrophilic in themselves, hence, in the separator comprising the polyolefin materials, it is difficult to maintain an alkaline electrolyte solution of the alkaline secondary battery.

Therefore, conventionally, as proposed in the Japanese-Laid Open No. Sho 63-34849, there has been proposed an alkaline secondary battery whose alkaline electrolyte solution is set to be maintained in the separator upon providing the polyolefin materials for separator with an OH-group so as to increase hydrophilicity by way of coating a surface of the above-mentioned polyolefin materials with an ethylene-vinyl alcohol copolymer resin, for example.

Further, in the alkaline secondary battery as described above, the positive electrode, for example, contains impurity ions such as ammonium ions. Such impurity ions transfer at discharge/charge, and thereby, self-discharge generates in the alkaline secondary battery due to the impurity ions at a middle charge depth of about 50 to 80%. Consequently, a problem exists that storage characteristic is degraded.

In this connection, in recent years, there have been proposed a separator wherein an acrylic resin monomer such as acrylic acid or the like is graft-polymerized with the polyolefin materials and then nitrogen impurity ions are captured by way of a carboxyl group contained in a resultant polymer, and a separator wherein the polyolefin materials are treated with concentrated sulfuric acid or fuming sulfuric acid so as to interpose a sulfone group into the polyolefin materials and then impurity ions are captured by the sulfone group interposed in the polyolefin materials, have been proposed.

However, in the case of the separator wherein the acrylic resin monomer such as acrylic acid or the like is graft-polymerized with the polyolefin materials, resistance to heat and resistance to oxidization are generally weak, and thereby, the separator cannot stand being used for a long time. Hence, there exists another problem that life span of the alkaline secondary battery is short.

Further, in the above-mentioned case of the separator wherein the polyolefin materials are treated with concentrated sulfuric acid or fuming sulfuric acid so as to interpose the sulfone group into the polyolefin materials, the separator is degraded when being treated with concentrated sulfuric acid or fuming sulfuric acid. Therefore, there exists a further problem that a short-circuit easily occurs between a positive electrode and a negative electrode.

In addition, when the carboxyl group or the sulfone group is interposed into the separator as described above, the alkaline electrolyte solution is consumed due to such groups having ions-exchange ability. Therefore, there also exists an additional problem that characteristics of the alkaline secondary battery are degraded.

SUMMARY OF THE INVENTION

An object of the present invention is to improve a separator for an alkaline secondary battery to be interposed between a positive electrode and a negative electrode in an alkaline secondary battery such as a nickel-metal hydride battery and the like.

Another object of the present invention is to attain an alkaline secondary battery excellent in storage characteristic upon improving the separator for an alkaline secondary battery as described above so as to prevent self-discharge due to impurity ions such as ammonium ions contained in the positive electrode.

In the present invention, the separator for an alkaline secondary battery to be interposed between the positive electrode and the negative electrode has carbon-carbon double bonds. An average amount of carbon-carbon double bonds in the separator is in the range of 10 $\mu$mol/g to 200 $\mu$mol/g, and an average amount of increased nitrogen in the separator after the separator is immersed in an alkaline aqueous solution having ammonium salt dissolved therein is not less than 140 $\mu$mol/g.

Further, when the separator for an alkaline secondary battery according to the present invention is used for an alkaline secondary battery, impurity ions such as ammonium ions and the like are captured at the part of the above-mentioned carbon-carbon double bonds existing in the separator for an alkaline secondary battery, whereby preventing self-discharge of the alkaline secondary battery due to the impurity ions. Therefore, storage characteristic of the alkaline secondary battery is improved.

In the separator for an alkaline secondary battery according to the present invention, when an amount of carbon-carbon double bonds in the separator is small, it is impossible to capture sufficiently impurity ions such as ammonium ions and the like, hence self-discharge can not be sufficiently prevented. On the other hand, when the amount is too large, said carbon reacts with oxygen which generates at the positive electrode, and thereby, the separator is oxidized, which makes characteristics thereof degraded. On this account, in the separator for an alkaline secondary battery according to the present invention, an average amount of carbon-carbon double bonds in the separator is set in the range of 10 $\mu$mol/g to 200 $\mu$mol/g.

Additionally, in the separator for an alkaline secondary battery according to the present invention, an average amount of increased nitrogen in the separator after the separator is immersed in an alkaline aqueous solution having ammonium salt dissolved therein is set not less than 140 $\mu$g/g so that impurity ions such as ammonium ions should be sufficiently captured.

In forming carbon-carbon double bonds in the separator for an alkaline secondary battery according to the present invention, a method of dehydrating polyolefin fiber provided with an OH-group, for example, exists.

In forming carbon-carbon double bonds using the method of dehydrating the polyolefin fiber provided with an OH-group, acid of every type can be used. However, when concentrated sulfuric acid or fuming sulfuric acid or the like is used, the polyolefin fiber is degraded, and thereby, a short-circuit easily occurs between the positive electrode and the negative electrode. Consequently, it is preferable that an acid selected from phosphoric acid, hydrochloric acid, and nitric acid is used for dehydration.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
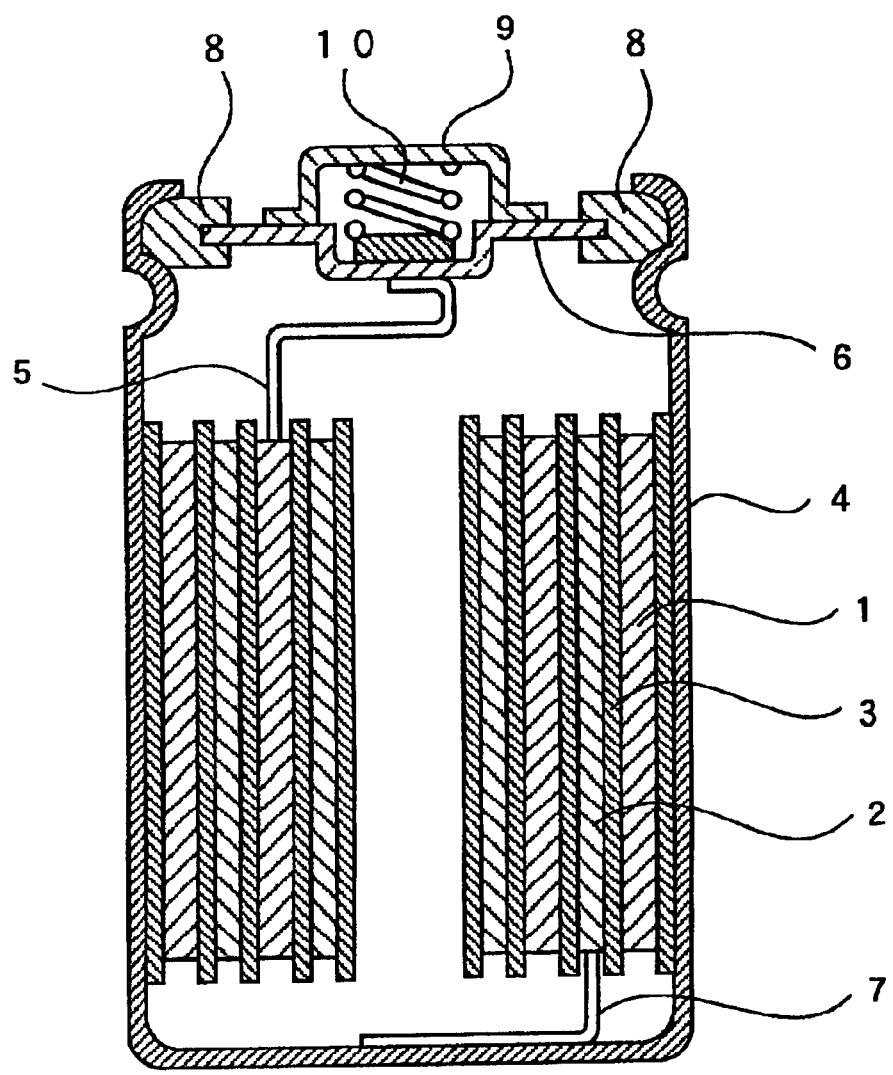
FIG. 1 is a sectional view showing an internal structure of an alkaline secondary battery fabricated in EXAMPLES, COMPARATIVE EXAMPLES, and TEST EXAMPLES of the present invention.

Now, a separator for an alkaline secondary battery, a method for preparing the same, and an alkaline secondary battery using the same will hereinbelow be described in detail on the basis of EXAMPLES. Moreover, the alkaline secondary batteries according to EXAMPLES of the invention and alkaline secondary batteries according to COMPARATIVE EXAMPLES using separators for an alkaline secondary battery not satisfying the conditions of the present invention will be compared to clarity that self-discharge is prevented, and thereby, storage characteristic is improved in the alkaline secondary battery according to EXAMPLES of the invention. It should be appreciated that the separator for an alkaline secondary battery, the method for preparing the same and the alkaline secondary battery of the invention are not limited to following EXAMPLES but variations and modifications thereto may be made within the scope and spirit of the invention.

EXAMPLE 1

In an alkaline secondary battery of EXAMPLE 1, a separator for an alkaline secondary battery was prepared as given under. First, polypropylene fiber and an ethylene-vinyl alcohol copolymer resin provided with an OH-group are kneaded, to obtain polypropylene nonwoven fabric provided with an OH-group. (This polypropylene nonwoven fabric contains split fiber comprising a copolymer of polypropylene and ethylene-vinyl alcohol in 50% of the amount of the whole separator, and has a thickness of 0.15 mm and a weight per unit area of 55 g/m$^2$).

Further, the above-mentioned polypropylene nonwoven fabric provided with an OH-group was immersed for 30 minutes in an aqueous solution of phosphoric acid heated up to 100° C., so as to be dehydrated, was rinsed with in the order of a diluted aqueous solution of phosphoric acid and pure water, and was dried at the temperature of 50° C., to obtain a separator for an alkaline secondary battery.

As to the separator for an alkaline secondary battery thus obtained, an average amount of carbon-carbon double bonds in the separator was found on the basis of absorption in the domain from ultraviolet ray to visible ray by a spectral analysis method. As a result, the average amount of carbon-carbon double bonds was 40 $\mu$mol/g as shown in the following Table 1.

Further, the above-mentioned separator for an alkaline secondary battery was immersed for 48 hours in a 500 ml of KOH aqueous solution of 8N having 10 g. of NH$_4$Cl dissolved therein in an airtight container, was rinsed with water sufficiently until it was impossible to recognize existence of nitrogen in ammonium. Afterward, an amount of nitrogen in the separator before and after the immersion of the separator in the above-mentioned alkaline aqueous solution having NH4Cl dissolved therein was respectively found by an oxidizing method and a nitrogen analysis method of reduced-pressure emission system. As a result, an average amount of increased nitrogen in the separator after the immersion was 500 $\mu$g/g as shown in the following Table 1.

Additionally, in the alkaline secondary battery of EXAMPLE 1, as a positive electrode, a sintered nickel electrode prepared by impregnating an aqueous solution of nickel nitrate having cobalt nitrate and zinc nitrate dissolved therein into a sintered nickel substrate having a porosity of 85% by a chemical impregnating method was used.

On the other hand, 1 part by weight of polyethylene oxide as a binding agent was added to 100 part by weight of hydrogen absorbing alloy powder represented by a structural formula of MmNi3$_{0.2}$Co$_{1.0}$Al$_{0.2}$Mn$_{0.6}$ and having an average particle diameter of 50 $\mu$m, and was mixed with each other, to prepare a paste. The paste thus prepared was applied evenly on both sides of punching metal plated with nickel, was dried, and was pressed, so as to obtain a hydrogen absorbing alloy electrode. The hydrogen absorbing alloy electrode thus obtained was used as a negative electrode.

Further, the above-mentioned positive electrode and negative electrode were used while an aqueous solution of potassium hydroxide having a concentration of 30% by weight was used as an alkaline electrolyte solution, so that a cylindrical alkaline secondary battery having a capacity of about 1000 mAh should be fabricated as shown in FIG. 1.

In fabricating an alkaline secondary battery, as shown in FIG. 1, a separator 3 was interposed between the positive electrode 1 and negative electrode 2, and they were contained in a battery can 4 upon being spirally wound. Afterward, the above-mentioned alkaline electrolyte solution was pored into the battery can 4, the battery can 4 was sealed, the positive electrode 1 was connected to a sealing cover 6 through a positive electrode lead 5, and the negative electrode 2 was connected to the battery can 4 through a negative electrode lead 7, to electrically separate the battery can 4 and the sealing cover 6 by an insulating packing 8. A coil spring 10 was provided between the sealing cover 6 and a positive electrode external terminal 9. When the internal pressure of the battery was abnormally increased, the coil spring 10 was compressed, so that gas inside the battery was discharged into the air.

EXAMPLE 2

In an alkaline secondary battery of EXAMPLE 2, in preparing a separator for an alkaline secondary battery, polypropylene nonwoven fabric provided with an OH-group obtained in the same manner as in EXAMPLE 1was used. The separator for an alkaline secondary battery was obtained in the same manner as in EXAMPLE 1 except that the above-mentioned polypropylene nonwoven fabric provided with an OH-group was immersed for 30 minutes in an aqueous solution of hydrochloric acid heated up to 100° C. so as to be dehydrated.

As to the separator for an alkaline secondary battery thus obtained, an average amount of carbon-carbon double bonds in the separator and an average amount of increased nitrogen in the separator after the immersion of the separator in the alkaline aqueous solution having NH$_4$Cl dissolved therein were found in the same manner as in EXAMPLE 1. As a result, the average amount of carbon-carbon double bonds in the separator was 32 $\mu$mol/g and the average amount of increased nitrogen in the separator after the immersion of the separator in the alkaline aqueous solution having NH$_4$Cl dissolved therein was 390 $\mu$g/g, as shown in the following Table 1.

Further, the alkaline secondary battery of EXAMPLE 2 was fabricated in the same manner as in EXAMPLE 1 except that the above-mentioned separator for an alkaline secondary battery was used.

EXAMPLE 3

In an alkaline secondary battery of EXAMPLE 3, in preparing a separator for an alkaline secondary battery, polypropylene nonwoven fabric provided with an OH-group obtained in the same manner as in EXAMPLE 1 was used. The separator for an alkaline secondary battery was prepared in the same manner as in EXAMPLE 1 except that the above-mentioned polypropylene nonwoven fabric provided with an OH-group was immersed for 30 minutes in an aqueous solution of nitric acid heated up to 100° C. so as to be dehydrated.

As to the separator for an alkaline secondary battery thus obtained, an average amount of carbon-carbon double bonds in the separator and an average amount of increased nitrogen in the separator after the immersion of the separator in the alkaline aqueous solution having $NH_4$ Cl dissolved therein were found in the same manner as in EXAMPLE 1. As a result, the average amount of carbon-carbon double bonds in the separator was 25 $\mu$mol/g and the average amount of increased nitrogen in the separator after the immersion of the separator in the alkaline aqueous solution having $NH_4$ Cl dissolved therein was 310 $\mu$g/g, as shown in the following Table 1.

Further, the alkaline secondary battery of EXAMPLE 3 was fabricated in the same manner as in EXAMPLE 1 except that the above-mentioned separator for an alkaline secondary battery was used.

COMPARATIVE EXAMPLE 1

In an alkaline secondary battery of COMPARATIVE EXAMPLE 1, in preparing a separator for an alkaline secondary battery, polypropylene nonwoven fabric provided with an OH-group obtained in the same manner as in EXAMPLE 1 was used. The polypropylene nonwoven fabric provided with an OH-group thus obtained was used as the separator for an alkaline secondary battery without being dehydrated.

Additionally, in the separator for an alkaline secondary battery, carbon-carbon double bonds were not contained, and an amount of nitrogen in the separator after the immersion of the separator in the alkaline aqueous solution having $NH_4$ Cl dissolved therein was not increased.

Further, the alkaline secondary battery of COMPARATIVE EXAMPLE 1 was fabricated except that the above-mentioned separator for an alkaline secondary battery was used.

COMPARATIVE EXAMPLE 2

In an alkaline secondary battery of COMPARATIVE EXAMPLE 2, in preparing a separator for an alkaline secondary battery, polypropylene nonwoven fabric provided with an OH-group obtained in the same manner as in EXAMPLE 1 was used. The separator for an alkaline secondary battery was prepared in the same manner as in EXAMPLE 1 except that the above-mentioned polypropylene nonwoven fabric provided with an OH-group was immersed for 30 minutes into an aqueous solution of concentrated sulfuric acid heated up to 50° C. so as to be dehydrated.

As to the separator for an alkaline secondary battery thus obtained, an average amount of carbon-carbon double bonds in the separator and an average amount of increased nitrogen in the separator after the immersion of the separator in the alkaline aqueous solution having $NH_4$ Cl dissolved therein were found in the same manner as in EXAMPLE 1. As a result, the average amount of carbon-carbon double bonds was 250 $\mu$mol/g and the average amount of increased nitrogen after the immersion was 100 $\mu$g/g, as shown in the following Table 1.

The separator for an alkaline secondary battery thus obtained was carbonized and became black, and the average amount of increased nitrogen in the separator after the immersion of the separator in the alkaline aqueous solution having $NH_4$ Cl dissolved therein became small. The reason for the above-mentioned changes is that double bond was stable under such conditions that the separator was carbonized, whereby reactivity with ammonia became degraded.

Further, an attempt to fabricate the alkaline secondary battery of COMPARATIVE EXAMPLE 2 in the same manner as in EXAMPLE 1 by way of using the separator for an alkaline secondary battery obtained as described above was made. However, the attempt was failed due to the separator for an alkaline secondary battery being degraded, which causing a short-circuit between a positive electrode and a negative electrode.

Next, each of the alkaline secondary batteries of EXAMPLES 1 to 3 and COMPARATIVE EXAMPLE 1 fabricated as above described was subject to charge for 16 hours at a charging current of 100 mA under the temperature conditions of 25° C., followed by discharge at a discharging current of 200 mA to 1 V. Additionally, 10 cycles of charge/discharge were performed in one cycle of the above-mentioned charge/discharge process, so as to measure discharge capacity at the 10 th cycle (Q10).

Moreover, each of the aforementioned alkaline secondary batteries of EXAMPLES 1 to 3 and COMPARATIVE EXAMPLE 1 was subject to the charge at the 11th cycle for 16 hours at a charging current of 100 mA under the temperature conditions of 25° C., was stored for 2 weeks under the temperature conditions of 50° C., and was subject to discharge at a discharging current of 200 mA under the temperature conditions of back to 25° C. again, so as to measure discharge cycle at the 11th cycle (Q11) A percentage of capacity retention in each of the alkaline secondary batteries after storage under high temperature conditions was found by way of the following formula:

percentage of capacity retention (%)=(Q11/Q10)×100

The results were shown in the following Table 1.

TABLE 1

| | dehydration | | content of carbon-carbon double bonds ($\mu$mol/g) | amount of increased nitrogen ($\mu$g/g) | percentage of capacity retention (%) |
|---|---|---|---|---|---|
| | acid | dehydrating temperature | | | |
| EXAMPLE 1 | phosphoric acid | 100° C. | 40 | 500 | 74 |

TABLE 1-continued

| | dehydration | | content of carbon-carbon double bonds (μmol/g) | amount of increased nitrogen (μg/g) | percentage of capacity retention (%) |
|---|---|---|---|---|---|
| | acid | dehydrating temperature | | | |
| EXAMPLE 2 | hydrochloric acid | 100° C. | 32 | 390 | 73 |
| EXAMPLE 3 | nitric acid | 100° C. | 25 | 310 | 70 |
| COMPARATIVE EXAMPLE 1 | — | — | 0 | 0 | 49 |
| COMPARATIVE EXAMPLE 2 | concentrated sulfuric acid | 50° C. | 250 | 100 | — |

As apparent from the results, in each of the alkaline secondary batteries of EXAMPLES 1 to 3 using a separator for an alkaline secondary battery wherein an average amount of carbon-carbon double bonds in the separator is in the range of 10 μmol/g to 200 μmol/g, and an average amount of increased nitrogen in the separator after being immersed in an alkaline aqueous solution having ammonium salt dissolved is not less than 140 μg/g, a percentage of capacity retention after storage under high temperature conditions is larger and storage characteristic in the alkaline secondary battery is much improved, compared to the alkaline secondary battery of COMPARATIVE EXAMPLE 1 wherein the polypropylene nonwoven fabric without being dehydrated is used as the separator for an alkaline secondary battery.

TEST A

In TEST A, in preparing a separator for an alkaline secondary battery, polypropylene nonwoven fabric provided with an OH-group obtained in the same manner as in EXAMPLE 1 was used. A separator for an alkaline secondary battery was obtained in the same manner as in EXAMPLE 1 except that the liquid temperature of the aqueous solution of phosphoric acid and the immersing time in EXAMPLE 1 were changed in dehydrating the polypropylene nonwoven fabric by way of immersing the same in an aqueous solution of phosphoric acid.

As shown in the following Table 2, the liquid temperature of the aqueous solution of phosphoric acid in EXAMPLE 1 was changed into 80° C. and the immersing time in EXAMPLE 1 was changed into 30 minutes in TEST EXAMPLE A1, the liquid temperature of the aqueous solution of phosphoric acid 100° C. and the immersing time 10 minutes in TEST EXAMPLE A2, the liquid temperature of the aqueous solution of phosphoric acid 100° C. and the immersing time 15 minutes in TEST EXAMPLE A3, the liquid temperature of the aqueous solution of phosphoric acid 120° C. and the immersing time 30 minutes in TEST EXAMPLE A4, the liquid temperature of the aqueous solution of phosphoric acid 120° C. and the immersing time 60 minutes in TEST EXAMPLE A5, and the liquid temperature of the aqueous solution of phosphoric acid 130° C. and the immersing time 90 minutes in TEST EXAMPLE A6.

Additionally, as to each of the alkaline secondary batteries thus obtained, an average amount of carbon-carbon double bonds in the separator and an average amount of increased nitrogen in the separator after the immersion of the separator in the alkaline aqueous solution having $NH_4Cl$ dissolved therein were found in the same manner as in EXAMPLE 1. The results were shown in the following Table 2.

Moreover, each of the alkaline secondary batteries of TEST EXAMPLES A1 to A6 was fabricated in the same manner as in EXAMPLE 1 except that each of the separators for an alkaline secondary batteries thus obtained was used.

Further, as to each of the alkaline secondary batteries of TEST EXAMPLES A1 to A6 thus fabricated, a percentage of capacity retention after storage under high temperature conditions was found in the same manner as in EXAMPLE 1 and COMPARATIVE EXAMPLE 1. The results were shown in the following Table 2.

TABLE 2

| | dehydration | | content of carbon-carbon double bonds (μmol/g) | amount of increased nitrogen (μg/g) | percentage of capacity retention (%) |
|---|---|---|---|---|---|
| | liquid temperature | immersing time | | | |
| COMPARATIVE EXAMPLE 1 | — | — | 0 | 0 | 49 |
| TEST EXAMPLE A1 | 80° C. | 30 minutes | 2 | 20 | 50 |
| TEST EXAMPLE A2 | 100° C. | 10 minutes | 10 | 140 | 69 |
| TEST EXAMPLE A3 | 100° C. | 15 minutes | 25 | 280 | 72 |
| EXAMPLE 1 | 100° C. | 30 minutes | 40 | 500 | 74 |

TABLE 2-continued

| | dehydration | | content of carbon-carbon double bonds (μmol/g) | amount of increased nitrogen (μg/g) | percentage of capacity retention (%) |
|---|---|---|---|---|---|
| | liquid temperature | immersing time | | | |
| TEST EXAMPLE A4 | 120° C. | 30 minutes | 150 | 1800 | 72 |
| TEST EXAMPLE A5 | 120° C. | 60 minutes | 200 | 2000 | 68 |
| TEST EXAMPLE A6 | 130° C. | 90 minutes | 400 | 4500 | 53 |

As apparent from the results, in each of the alkaline secondary batteries of EXAMPLES 1 and TEST EXAMPLES A2 to A5 using a separator for an alkaline secondary battery wherein an average amount of carbon-carbon double bonds in the separator is in the range of 10 μmol/g to 200 μmol/g, and an average amount of increased nitrogen in the separator after being immersed in an alkaline aqueous solution having ammonium salt dissolved therein is not less than 140 μg/g, a percentage of capacity retention after storage under high temperature conditions is larger and storage characteristic in the alkaline secondary battery is much improved, compared to each of the alkaline secondary batteries of COMPARATIVE EXAMPLE 1 and TEST EXAMPLE A1 using a separator for an alkaline secondary battery wherein an average amount of carbon-carbon double bonds in the separator is less than 10 μmol/g, and an average amount of increased nitrogen in the separator after being immersed in an alkaline aqueous solution having ammonium salt dissolved therein is less than 140 μg/g or the alkaline secondary battery of TEST EXAMPLE A6 using the separator for an alkaline secondary battery wherein an average amount of carbon-carbon double bonds in the separator is more than 200 μmol/g.

TEST B

In TEST B, as a separator for an alkaline secondary battery, one was used, prepared by connecting in an appropriate weight ratio a separator for an alkaline secondary battery obtained by immersing for 30 minutes the above-mentioned polypropylene nonwoven fabric provided with an OH-group in an aqueous solution of phosphoric acid heated up to 100° C. so as to be dehydrated in the same manner as in EXAMPLE 1 with a separator for an alkaline secondary battery comprising polypropylene nonwoven fabric provided with an OH-group without being dehydrated as in COMPARATIVE EXAMPLE.

As shown in the following Table 3, a weight ratio of the separator for an alkaline secondary battery with being dehydrated and that without being dehydrated was set 8 to 2 in TEST EXAMPLE B1, 5 to 5 in TEST EXAMPLE B2, 4 to 6 in TEST EXAMPLE B3, 3 to 7in TEST EXAMPLE B4, 2 to 8 in TEST EXAMPLE B5, and 1 to 9 in TEST EXAMPLE B6, to obtain each separator for an alkaline secondary battery.

As to each of the separators for an alkaline secondary batteries thus obtained, an average amount of carbon-carbon double bonds in the separator and an average amount of increased nitrogen in the separator after the immersion of the separator in the alkaline aqueous solution having $NH_4Cl$ dissolved therein were shown in the following Table 3.

Further, each of the alkaline secondary batteries of TEST EXAMPLES B1 to B6 was fabricated in the same manner as in EXAMPLE 1 except that each of the separators for an alkaline secondary batteries thus obtained was used.

Moreover, as to each of the alkaline secondary batteries of TEST EXAMPLES B1 to B6 thus fabricated, a percentage of capacity retention after storage under high temperature conditions was found in the same manner as in EXAMPLE 1 and COMPARATIVE EXAMPLE 1. The results were shown in the following Table 3.

TABLE 3

| | weight ratio of separators | | content of carbon-carbon double bonds (μmol/g) | amount of increased nitrogen (μg/g) | percentage of capacity retention (%) |
|---|---|---|---|---|---|
| | separator with being dehydrated | separator without being dehydrated | | | |
| EXAMPLE 1 | 10 | 0 | 40 | 500 | 74 |
| TEST EXAMPLE B1 | 8 | 2 | 32 | 400 | 74 |
| TEST EXAMPLE B2 | 5 | 5 | 20 | 250 | 73 |
| TEST EXAMPLE B3 | 4 | 6 | 16 | 200 | 71 |
| TEST EXAMPLE B4 | 3 | 7 | 12 | 150 | 69 |
| TEST EXAMPLE B5 | 2 | 8 | 8 | 100 | 53 |

TABLE 3-continued

|  | weight ratio of separators | | content of carbon- | | percentage |
| --- | --- | --- | --- | --- | --- |
|  | separator with being dehydrated | separator without being dehydrated | carbon double bonds ($\mu$mol/g) | amount of increased nitrogen ($\mu$g/g) | of capacity retention (%) |
| TEST EXAMPLE B6 | 1 | 9 | 4 | 50 | 50 |
| COMPARATIVE EXAMPLE 1 | 0 | 10 | 0 | 0 | 49 |

As apparent from the results, in each of the alkaline secondary batteries of EXAMPLE 1 and TEST EXAMPLES B1 to B4 using a separator for an alkaline secondary battery wherein an average amount of carbon-carbon double bonds in the separator is in the range of 10 $\mu$mol/g to 200 $\mu$mol/g, and an average amount of increased nitrogen in the separator after being immersed in an alkaline aqueous solution having ammonium salt dissolved therein is not less than 140 $\mu$mol/g, a percentage of capacity retention after storage under high temperature conditions is larger and storage characteristic in the alkaline secondary battery is much improved, compared to the alkaline secondary battery of COMPARATIVE EXAMPLE 1 and TEST EXAMPLES B5 and B6 using a separator for an alkaline secondary battery wherein an average amount of carbon-carbon double bonds in the separator is less than 10 $\mu$mol/g, and an average amount of increased nitrogen in the separator after being immersed in an alkaline aqueous solution having ammonium salt dissolved therein is less than 140 $\mu$g/g.

Although the present invention has been fully described by way of examples, it is to be noted that various changes and modification will be apparent to those skilled in the art.

Therefore, unless otherwise such changes and modifications depart from the scope of the present invention, they should be construed as included therein.

What is claimed:

1. A separator for an alkaline secondary battery to be interposed between a positive electrode and a negative electrode in an alkaline secondary battery,
    wherein said separator contains carbon to carbon double bonds in an average amount of 10 $\mu$mol/g to 200 $\mu$mol/g, wherein
    said separator increases in nitrogen content after being immersed in an alkaline aqueous solution having ammonium salt dissolved therein an average amount of not less than 140 $\mu$g/g.

2. A method for preparing the separator for an alkaline secondary battery as claimed in claim 1 including a process of dehydrating polyolefin fiber provided with an OH-group to form double bond of carbon in the separator.

3. The method for preparing the separator for an alkaline secondary battery as claimed in claim 2, wherein an acid to be used for dehydrating the above-mentioned polyolefin fiber provided with an OH-group is an acid selected from the group consisting of phosphoric acid, hydrochloric acid, and nitric acid.

4. An alkaline secondary battery provided with a positive electrode, a negative electrode, a separator to be interposed between the positive electrode and the negative electrode, and an alkaline electrolyte solution, wherein the above-mentioned separator is the separator for an alkaline secondary battery as claimed in claim 1.

* * * * *